Sept. 18, 1956  F. TOSI ET AL  2,763,465
AIR OPERATED HOIST
Filed July 17, 1953  2 Sheets-Sheet 1
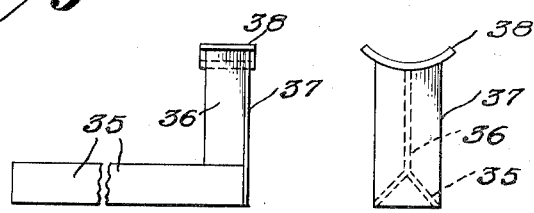
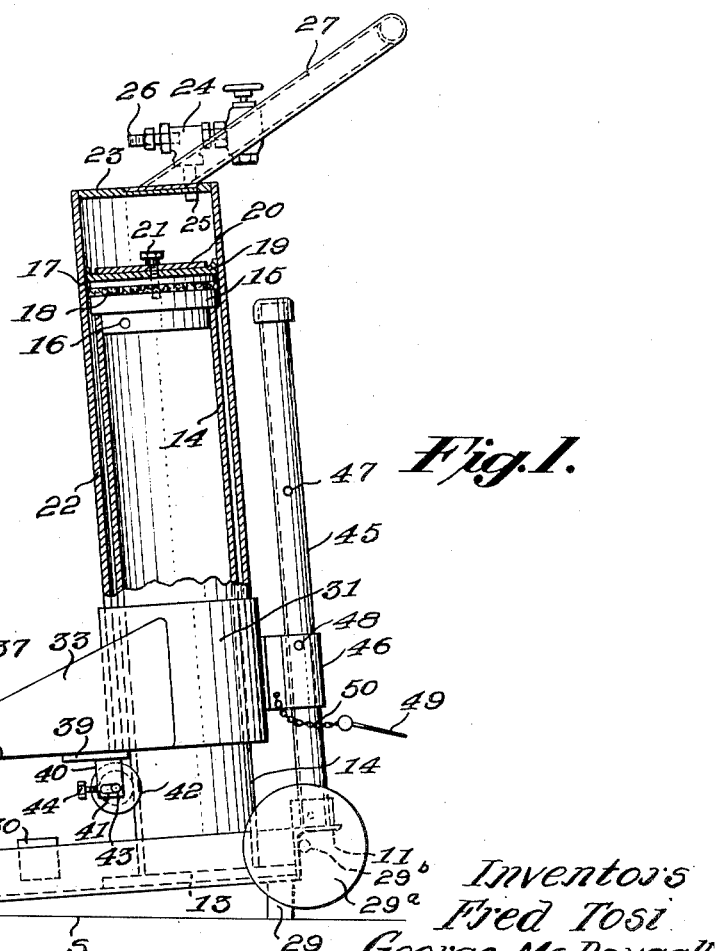
Inventors
Fred Tosi
George McDougall
M. C. Kissinger
Attorney

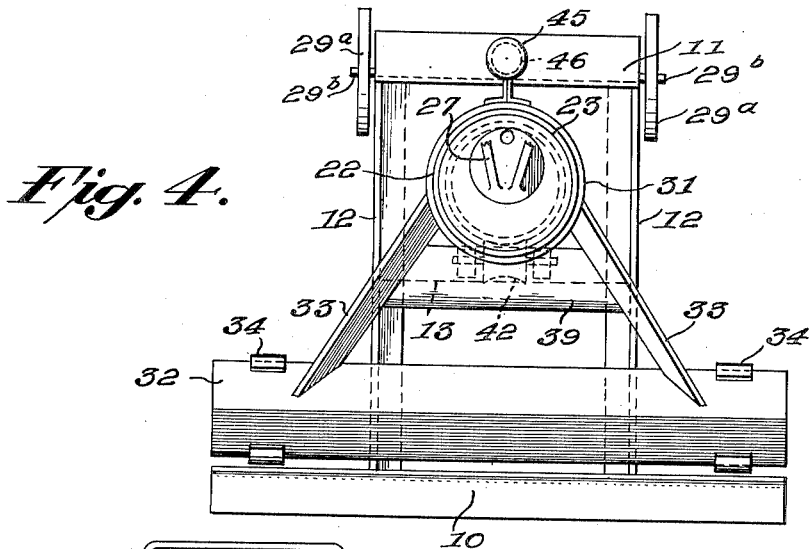
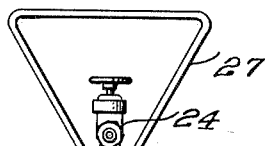
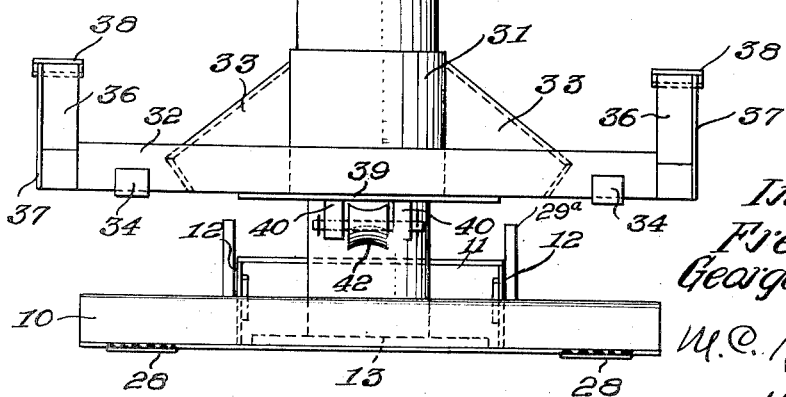

United States Patent Office 2,763,465
Patented Sept. 18, 1956

2,763,465

AIR OPERATED HOIST

Fred Tosi and George McDougall, Monongahela, Pa.; said McDougall assignor to said Tosi Application July 17, 1953, Serial No. 368,582

3 Claims. (Cl. 254—93)

This invention relates to an air operated hoist.

The invention is more particularly concerned with an air operable hoist for use in initially lifting automobile bodies and thereafter the wheels thereof thereby greatly facilitating the removal and application of wheels and tires.

A primary object of the invention is to provide an improved hoist for the above noted purpose which is rugged in construction while embodying relatively few co-operating parts, dependable in operation, and which is capable of construction at relatively low cost.

A further and more specific object of the invention is to provide an air operable hoist which embodies lifting means which is linearly movable in a line slightly inclined to the vertical in a direction toward the automobile to be lifted whereby neither the automobile or hoist is pulled out of position during the hoisting operation.

Other objects and advantages of the invention will become apparent in the course of the following detailed description, taken in connection with the accompanying drawings, wherein—

Fig. 1 is a view partially in side elevation and partially in vertical section and showing the hoist in a preferred structural embodiment thereof.

Fig. 2 is a broken side elevational view of one of the bumper rests.

Fig. 3 is an end elevational view of the rest shown in Fig. 2 and as viewed from the right thereof.

Fig. 4 is a top plan view of the hoist with the valve removed and the handle broken away.

Fig. 5 is a front elevational view of the hoist.

Referring now in detail to the drawings, the improved hoist comprises a base frame including a forward relatively long angle bar 10 and a rear relatively short angle bar 11 which is reversed in position with respect to the forward angle bar, as is clearly shown in Fig. 1. The bars 10 and 11 are rigidly interconnected by means of a pair of angle bars 12 which are in spaced parallel relation and which are disposed in right angular relation to the bars 10 and 11.

A plate 13 spans the base flanges of the angle bars 12 and has its opposite side edges rigidly secured thereto.

A generally vertically disposed inner cylinder 14 has its lower end supported on the plate 13 and rigidly secured thereto. It is to be observed that the cylinder 14 is disposed adjacent the rear end of the base frame.

The upper end of cylinder 14 is provided with a cast iron head 15 which is secured to the cylinder by screws or the like 16. The head 15 is provided with a circumferential groove 17 in which is disposed a felt packing ring 18.

Disposed upon the head 15 is a seal embodying a neoprene disk 19 and a superposed plate 20 which together with the disk is secured to the head by a screw bolt 21.

An outer cylinder 22 surrounds the inner cylinder 14 and is axially movable relative thereto.

The packing ring 18 engages and lubricates the inner wall of cylinder 22 and the seal 19, 20 provides an air tight connection between the two cylinders.

A plate 23 is rigidly secured within the upper end of cylinder 22 and which provides with the cylinder wall and the seal 19, 20 an air chamber into and from which air is admitted and exhausted by means of a suitable valve 24 which includes a portion 25 extending inwardly through plate 23 and a hose connection portion 26.

The plate 23 is provided with a handle 27, which may be of flat form as in Figs. 4 and 5, or of tubular form as in Fig. 1, for a purpose later to appear.

The base frame is normally disposed in angular relation to the horizontal, as is indicated in Fig. 1 and same is provided with a pair of laterally spaced rollers 28 suitably rotatably supported on shafts carried by the angle bar 10 and as a means for retaining the frame in the aforesaid angular position. A pair of foot members 29 are provided adjacent the rear edge of the frame, the foot members and rollers 28 engaging a floor surface S. Furthermore, a pair of wheels 29a are rotatably supported on shaft 29b rigidly secured to angle bar 11 and the peripheries of the wheels are normally out of contact with surface S.

The frame is further provided with a pair of stop members 30.

A tubular member 31 surrounds the lower end of the outer cylinder 22 and is rigidly secured thereto.

Car bumper engaging means including an elongated member 32 is rigidly secured to the tubular member 31 by means of a pair of brace plates 33 whose rear ends are rigidly secured to the said tubular member and whose forward ends are rigidly secured to the said member 32.

The member 32 is inverted V-shape in cross section and a pair of clips 34 spans the open lower side of the member and are rigidly secured thereto. The member 32 together with the clips 34 provides a guide for the shanks 35 of a pair of bumper rests each of which comprises right angularly intersecting vertical plates 36 and 37 on which is supported an arcuate bumper receiving plate 38.

The shanks 35 are also of inverted U-shape and are telescopically engageable within the member 32 in overlapping relation. The plates 36 and 37 are rigidly secured to the shanks 35.

A plate 39 spans the brace plates 33 and is rigidly secured to their lower edges.

A pair of journal lugs 40 depend from the plate 39 and are provided with slots 41 elongated at right angles to the axis of cylinder 22. A roller 42 has the opposite ends of its axle 43 rotatably journalled in the slots 41 and the periphery of the roller is curved in conformity with the outer wall of the inner cylinder 14 and such periphery is adjustably retained in contact with the cylinder by means of adjusting bolts 44 extending into slots 41 and engaging axle 43.

Co-operating with the roller 42 for constraining the cylinder 22 to axial movement is a guide means including a cylindrical post 45 disposed in parallel relation to the axes of cylinders 14 and 22 and whose lower end is rigidly secured to the angle bar 11.

A tubular guide member 46 is rigidly secured to the tubular member 31 in diametrically opposed relation to roller 42 and which slidably receives the post 45.

The post 45 and guide member 46 are provided with apertures 47 and 48 respectively adapted for alignment and reception of a pin 49 which is secured to member 46 by a chain 50 for a purpose later to appear.

In operation the improved hoist as shown in Fig. 1 is grasped by handle 27 and rotated clockwise about the foot members 29 as fulcrums until the peripheries of wheels 29ª engage the surface S whereupon the hoist is moved bodily into position with the bumper engaging means disposed vertically beneath a car bumper and with the structure inclined toward the car as in Fig. 1. Air is then admitted through valve 24 into the chamber between the inner and outer cylinders 14 and 22, which results in the outer cylinder 22 and therewith the bumper engaging means being elevated with cylinder 22 moving axially of cylinder 14 by means of roller 42 and guide means 45, 46.

Upon initial elevation of the bumper engaging means, the bumper will be engaged by plates 38 and elevated with a corresponding elevation of the car body preceding the elevation of the wheels whereby the fenders will be sufficiently separated from the wheels to permit removal and application of tires therefrom and thereto.

When the car body with the wheels has been sufficiently elevated, the air is cut off and pin 49 is introduced into aligned apertures 47 and 48 to hold the car body in elevated position as an assurance that same will not move downwardly as a result of possible escape of air.

To lower the car body, the air is permitted to escape under pressure of the car body through valve 24 with a lowering of cylinder 22 and therewith the bumper engaging means which is fully arrested upon engagement with stops 30.

Due to the telescoping engagement of shanks 35 within the member 32, the bumper rests provided by plates 36, 37, 38 may be positioned in any desired spaced relation either symmetrical or non-symmetrical to the transverse center of member 32.

The inclined position of the hoist assures maintenance of position of both itself and the car during a hoisting operation.

Having described our invention in accordance with a preferred structural embodiment thereof, what we claim and desire to secure by U. S. Letters Patent is:

1. An air operable hoist comprising a generally rectangular frame including a pair of spaced parallel side angle bars, a front angle bar secured to the front ends of said side angle bars and having its opposite ends extending substantially beyond the outer edges thereof at equal distances, a rear angle bar secured to the rear ends of said side angle bars and being of a length equal to the distance between the outer edges of the side angle bars, a floor engageable roller rotatably supported by said front bar adjacent each end thereof, a pair of wheels rotatably supported by said rear bar and being disposed in planes outwardly of said side bars, a pair of foot members secured to the frame adjacent said rear bar and being of substantially greater vertical dimensions than the distance of projection of the wheels below said frame for normally retaining the frame in an inclined position with the wheels out of engagement with the floor, a plate disposed between said side bars and secured thereto, an inner cylinder supported by said plate and projecting vertically upwardly therefrom, an outer cylinder telescoped over said inner cylinder, said cylinders having closed upper ends defining an air chamber therebetween, means for admitting air to and relieving same from said chamber for axial movement of the outer cylinder, a cylindrical post projecting upwardly from said rear bar in spaced and parallel relation to said cylinders, a tubular member surrounding the outer cylinder adjacent its lower end and rigidly secured thereto, a tubular guide member secured to said tubular member and projecting rearwardly therefrom and being telescoped over said post, a pair of brace plates projecting from said tubular member in outwardly diverging relation and having their inner ends rigidly secured thereto, and car bumper engaging means supported by the outer ends of said brace plates.

2. The structure according to claim 1, together with a plate rigidly secured to the lower edges of said brace plates contiguous said inner cylinder, a pair of journal lugs depending from said plate, a roller rotatably supported in said lugs, said roller being curved in conformity with the outer wall of said inner cylinder and being engageable therewith, and means for adjusting said roller toward and away from said inner cylinder.

3. The structure according to claim 1, wherein said car bumper engaging means comprises an elongated member of inverted V-shape in cross section rigidly secured to the front ends of said brace plates, a pair of clips spanning the lower open side of the said elongated member with one adjacent each end thereof, a shank of inverted V-shape in cross section being slidably supported in said elongated member at each end thereof and being supported by a respective one of said clips, and a bumper rest projecting upwardly from the outer end of each of said shanks.

References Cited in the file of this patent

UNITED STATES PATENTS

| | | |
|---|---|---|
| 1,214,378 | Sadlock | Jan. 30, 1917 |
| 1,868,935 | Breneman | July 26, 1932 |
| 2,314,589 | Mandl | Mar. 23, 1943 |
| 2,412,414 | Mueller | Dec. 10, 1946 |
| 2,605,998 | Beck | Aug. 5, 1952 |
| 2,669,422 | Branick | Feb. 16, 1954 |